United States Patent Office 2,915,389
Patented Dec. 1, 1959

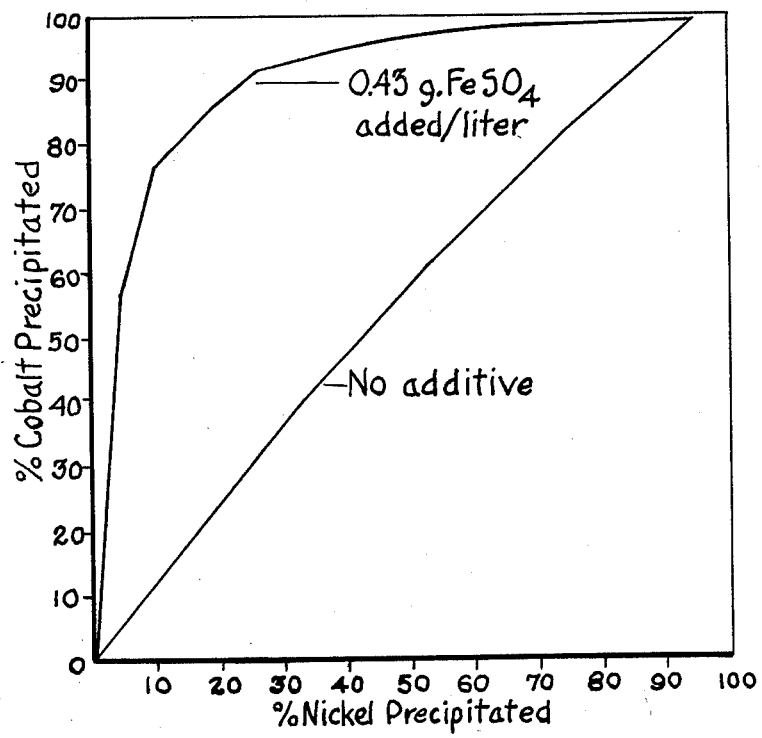

2,915,389

PROCESS FOR SEPARATING COBALT AND NICKEL FROM AMMONIACAL SOLUTIONS

John G. Dean, Wilton, Conn., assignor to the United States of America as represented by the Administrator, General Services Administration Application May 21, 1958, Serial No. 736,937

1 Claim. (Cl. 75—108)

This invention relates to the separation of nickel and cobalt from an ammoniacal solution in which they are dissolved and more particularly to a process in which the cobalt is selectively precipitated from the solution to provide eventually a nickel compound containing so little cobalt as to be commercially acceptable to a greater extent than heretofore.

A prior art process is known wherein nickel is extracted from nickeliferous ores containing some cobalt by reducing such ores in a furnace, next leaching the calcined ores in an ammoniacal solution to extract the nickel and the cobalt, and finally distilling the decanted product liquor to cause the nickel and cobalt to precipitate as nickel and cobalt compounds. In theory, such compounds will precipitate sequentially from the product liquor during distillation if most of the cobalt is in either the cobaltous or the cobaltic state and can be selectively filtered from the liquor. In actual practice, however, the two precipitates form practically simultaneously because of the presence in the product liquor of certain sulfur contaminants which tend so to affect the cobalt as to distribute it between the two states. It is therefore not commercially practical to separate the nickel and the cobalt by the known process so that after the intermixed nickel and cobalt compounds are calcined to form oxides of nickel and cobalt, the combined oxides, which are mainly nickel, are employed in industry wherever the amount of contained cobalt is not considered deleterious.

The foregoing inability to separate the cobalt from the nickel creates a number of disadvantages. Thus, if the amount of cobalt in the ore is so great that the finished oxides contain more than one part cobalt to one hundred parts nickel, the oxides have a considerably reduced market. To avoid this condition, it is customary to operate the process inefficiently in the leaching phase to limit the extraction of cobalt and thus produce a commercially acceptable product. However, this remedy has the effect of simultaneously lowering the amount of nickel eventually recovered leading to wastage of the nickel which ends up in the plant tailings heap.

The present invention contemplates the use of an additive to the ammoniacal product liquor which will cause precipitation of a large proportion of the cobalt from the liquor before the nickel whereby the latter is recoverable in the form of a relatively pure compound. Additives which successfully meet this objective and which permit selective precipitation of the cobalt from the product liquor with very little co-precipitation of nickel are ferrous sulfate and ferrous ammonium sulfate.

The manner in which these materials function is somewhat obscure. However, it is believed that the action of these sulfates in precipitating the cobalt involves a combination of reduction of the cobalt from the cobaltic to the cobaltous form and simultaneous oxidation of the sulfates from the ferrous to the ferric form which promptly precipitates hydrated ferric oxide from the product liquor. This latter material has a unique capacity for adsorbing the cobalt and co-precipitating it from solution. Because the cobalt remaining in the product liquor, after treatment with these sulfates, has been reduced to the cobaltous form, it will precipitate selectively from the product liquor and before the nickel upon partial distillation of the liquor. Thus, it is possible to separate the various cobalt bearing precipitates from the product liquor as by filtration leaving a clarified liquor from which can be precipitated by further distillation nickel compounds relatively free of cobalt.

An object of the present invention is to provide a process whereby cobalt is precipitated selectively from an ammoniacal solution containing nickel and cobalt by treating such solution with ferrous sulfate before distillation thereof.

Another object of the invention is to provide a process whereby cobalt is precipitated selectively from an ammoniacal solution containing nickel and cobalt by treating such solution with an amount of ferrous sulfate chemically equivalent to the amount of cobalt in the solution before distillation of the solution.

Other objects and many of the attendant advantages of this invention will be readily appreciated as the same becomes better understood by reference to the following detailed description when considered in connection with the accompanying drawing wherein the single figure is a graph showing the effects of ferrous sulfate on nickel-cobalt fractionation during distillation of an ammoniacal leach liquor containing 1.29 parts cobalt to 100 parts nickel.

The novel process disclosed herein is intended to be employed in conjunction with a well known process for recovering nickel from nickeliferous ore containing cobalt and iron such as is found in Cuba in considerable quantities. The ore is dried to reduce substantially the moisture content, is ground to produce a finely divided mass, and is fed into the top of a verticle multiple hearth reduction furnace through which it passes downwardly at a slow rate. Undiluted producer gas is introduced at a low point in the furnace and combustion gases may be introduced at various higher levels which cause the ore to be preheated to a temperature of about 600° C. and then to be slowly heated in a reducing atmosphere to a final temperature between 700° C. and 850° C.

The calcined ore is cooled after it leaves the furnace and is eventually treated with an ammoniacal solution to leach out the nickel and cobalt. The ammoniacal solution is allowed to settle for a sufficient time to permit decantation of a product liquor containing a large percentage of the nickel in the ore and much of the cobalt. The product liquor is passed through a bubble tower countercurrent to a flow of steam which distills the ammonia and other dissolved gases from the product liquor thereby causing the nickel and cobalt to precipitate generally in the form of carbonates. These carbonates may then be calcined to form oxides which are commercially useful. As previously pointed out, the nickel and cobalt co-precipitate and provide a final product which has more limited use than would a nickel product having a smaller cobalt content.

The present invention departs from the foregoing process by treating the product liquor after decantation and prior to distillation with either ferrous sulfate or ferrous ammonium sulfate. These sulfates have the effect of causing the cobalt to precipitate immediately or in the very early stages of distillation in advance of the nickel whereby the cobalt compounds may be separated selectively from the product liquor. Very little of the nickel compounds will precipitate at this time so that it is possible to recover most of the nickel during subsequent distillation and relatively free of cobalt. The general technique of applying the ferrous sulfate is to add it as a solid or in an aqueous solution to the leach liquor in quantities approximately chemically equivalent to the cobalt content. However, if an amount of ferrous sulfate chemically equivalent to several times the cobalt content is added to the product liquor, it will assure precipitation of so much of the cobalt before distillation as to make subsequent partial distillation unnecessary to secure a relatively cobalt-free nickel product.

*Examples*

A series of experiments illustrating the profound improvement obtained by using ferrous sulfate as against nickel-cobalt fractionation without an additive were conducted using a leach liquor containing 1.29 parts of cobalt to one hundred parts of nickel. Distillations of the liquors were carried to completion but frequent samplings of the slurry were taken beginning a number of minutes before visible precipitation and continuing until precipitation was practically completed in order to allow following of the nickel-cobalt fractionation. The results of these experiments are shown in the following table and are presented graphically in the single figure of the drawing which is plotted from columns 7 and 8 of the table and shows the relationship of the percentages of cobalt and nickel which are precipitated when no additive is used in the leach liquor and when ferrous sulfate is used.

|  | Filtrate | | | | | Ppt. (by difference) | | |
|---|---|---|---|---|---|---|---|---|
|  | Nickel | | Cobalt | | Pts. Co/ 100 pts. Ni | Ni Percent of Total | Co Percent of Total | Pts. Co/ 100 pts. Ni |
|  | g./100 ml. | Percent of Total | g./100 ml. | Percent of Total |  |  |  |  |
| Leach liquor without additives | | | | | | | | |
| Leach liquor | 1.288 | 100.0 | .0166 | 100.0 | 1.29 |  |  |  |
| Min. from visible pptn.: | | | | | | | | |
| −18 | 1.294 | 100.0 | .0166 | 100.0 | 1.28 | 0 | 0 |  |
| 10 | 0.752 | 58.1 | .00830 | 50.0 | 1.10 | 41.9 | 50.0 | 1.53 |
| 20 | 0.340 | 26.2 | .00315 | 19.0 | 0.93 | 73.8 | 81.0 | 1.41 |
| 30 | 0.103 | 8.0 | .000866 | 5.2 | 0.84 | 92.0 | 94.8 | 1.32 |
| 45 | 0.0175 | 1.5 | .000381 | 2.4 | 2.18 | 98.5 | 97.6 | 1.27 |
| 60 | 0.00516 | 0.4 | .000320 | 1.9 | 6.20 | 99.6 | 98.1 | 1.29 |
| Leach liquor with added ferrous sulfate, 0.43 g. FeSO₄/l., (equivalent to cobalt content) | | | | | | | | |
| Leach liquor | 1.288 | 100.0 | .0166 | 100.0 | 1.29 |  |  |  |
| Min. from visible pptn.: | | | | | | | | |
| −20 | 1.291 | 100.2 | .0156 | 93.9 | 1.21 | 0 | 6.1 |  |
| 0 | 1.233 | 95.7 | .00794 | 47.8 | 0.64 | 4.3 | 52.2 | 15.7 |
| 2 | 1.163 | 90.3 | .00407 | 24.5 | 0.35 | 9.7 | 75.5 | 10.0 |
| 7 | 0.921 | 71.5 | .00128 | 7.7 | 0.14 | 28.5 | 92.3 | 4.17 |
| 15 | 0.500 | 38.8 | .000278 | 1.7 | 0.056 | 61.2 | 98.3 | 2.07 |
| 30 | 0.0618 | 4.8 | .000031 | 0.2 | 0.050 | 95.2 | 99.8 | 1.35 |

The table and graph dramatically establish the marked effectiveness of small amounts of ferrous sulfate for inducing the early precipitation of cobalt. Both the graph and the table (see columns 7 and 8) show that when no additive is used, the nickel and cobalt tend to precipitate in approximately equal percentages throughout distillation but that when ferrous sulfate is added to the leach liquor before distillation, the cobalt precipitates at a much higher rate at the beginning of the distillation process than does the nickel. It is obvious therefore that if only a partial distillation is permitted to take place after using ferrous sulfate as an additive, much of the cobalt can be precipitated from the leach liquor leaving comparatively little remaining in the final product liquor. It will also be noted from the first column that the whole process is considerably speeded up so that there is a large saving of process time and process heat.

Having employed a cheap material such as ferrous sulfate to obtain a major separation of the nickel and cobalt, it is thereafter feasible to dissolve the filter cake containing most of the cobalt, but also a valuable percentage of nickel, in an ammoniacal solution and to then precipitate the cobalt from the solution by adding thereto a relatively expensive but more efficient additive such as sodium sulfide prior to distillation. After separating the precipitate, the clarified leach liquor, which will contain most of the nickel, can then be added to the product liquor obtained after the initial partial distillation thus making it possible to recover almost all of the nickel reduced from the ore when the total product liquor is completely distilled. Likewise, the final filter cake will contain most of the cobalt which can be recovered by well known methods.

Because the nickel and cobalt resulting from the final distillations will each have very little of the other metal allied with it, they will each be a higher commercial grade and thus bring better prices.

It should be understood, of course, that the foregoing disclosure relates to only a preferred embodiment of the invention and that numerous modifications or alterations may be made therein without departing from the spirit and scope of the invention as set forth in the appended claim.

What is claimed and desired to be protected by Letters Patent of the United States is:

In the recovery of nickel from an ammoniacal leach solution containing nickel, cobalt and the usual impurities, the process of obtaining the nickel content substantially free of cobalt which comprises adding to the ammoniacal leach solution an amount of ferrous sulfate substantially chemically equivalent to the amount of cobalt in the leach solution, thereafter partially distilling the solution for a period sufficient to cause precipitation of a major portion of the cobalt but relatively little of the nickel, separating the precipitate from the remaining solution, dissolving the precipitate in a second ammoniacal leach solution, adding sodium sulfide to said second leach solution to precipitate most of the cobalt and relatively little of the nickel therefrom, separating the latter precipitate from the remaining second solution, and mixing said two remaining solutions together.

References Cited in the file of this patent

UNITED STATES PATENTS

| 2,711,957 | Schaufelberger | June 28, 1955 |
| 2,728,636 | Van Hare et al. | Dec. 27, 1955 |
| 2,735,760 | Allen et al. | Feb. 21, 1956 |

FOREIGN PATENTS

| 523,017 | Canada | Mar. 20, 1956 |